United States Patent [19]
Tinkler et al.

[11] Patent Number: 6,007,052
[45] Date of Patent: Dec. 28, 1999

[54] SYSTEM AND METHOD FOR LOCAL AREA IMAGE PROCESSING

[75] Inventors: Richard D. Tinkler; Mark A. Gohlke, both of Plano; Luan B. Do, Richardson, all of Tex.

[73] Assignee: Raytheon Company, Lexington, Mass.

[21] Appl. No.: 09/060,124

[22] Filed: Apr. 14, 1998

Related U.S. Application Data

[60] Provisional application No. 60/049,422, Jun. 12, 1997.

[51] Int. Cl.$^6$ ....................................................... G06K 9/36
[52] U.S. Cl. .......................... 254/190; 382/284; 348/586
[58] Field of Search ................................... 382/190, 173, 382/180, 254, 279, 284, 304; 348/584, 586, 598

[56] References Cited

U.S. PATENT DOCUMENTS

| | | | |
|---|---|---|---|
| 5,140,416 | 8/1992 | Tinkler | 358/88 |
| 5,602,934 | 2/1997 | Li et al. | 382/128 |
| 5,710,830 | 1/1998 | Holeva | 382/173 |
| 5,937,104 | 8/1999 | Henderson et al. | 382/279 |

FOREIGN PATENT DOCUMENTS

| | | | |
|---|---|---|---|
| 0398861 | 11/1990 | European Pat. Off. | H04N 1/40 |
| 0476959 | 3/1992 | European Pat. Off. | G06F 15/72 |

*Primary Examiner*—Andrew W. Johns
*Attorney, Agent, or Firm*—Baker & Botts, L.L.P.

[57] ABSTRACT

A method of image processing and the image processor which includes providing a convolution operator having an input for receiving raw imaging data at a data rate N and a plurality of output paths M. The convolution operator provides a time (phase) delay T to the imaging data between the input and the output paths and applies the imaging data on a time delayed basis to the output paths in phased relation to their time of application to the convolution operator. The convolution operator provides a low pass filtering operation to the data to provide background information. A phase equalization circuit is provided having an input for receiving the raw imaging data at the data rate N and M output paths, one path corresponding to each output path of the convolution operator, to provide a time delay to the raw imaging data at each output path of the phase equalization circuit equal to the time (phase) delay T of the convolution operator. The background information from the convolution operator is subtracted from the raw image data from the phase equalization circuit to provide feature information. A combination of background information and the feature information is then provided. The low pass filtering operation includes providing a one or two dimensional decimation to the data and providing a one or two dimensional interpolation of the decimated data.

26 Claims, 1 Drawing Sheet

SYSTEM AND METHOD FOR LOCAL AREA IMAGE PROCESSING

CROSS REFERENCE TO RELATED APPLICATIONS:

This application claims priority under 35 U.S.C. §119 of provisional application number 60/049,422 filed Jun. 12, 1997 entitled "System and Method for Local Area Image Processing.

BACKGROUND OF THE INVENTION

1. Field of the Invention

This invention relates to a processor architecture and method which allows formation of enhanced, high bandwidth video signals from low bandwidth processing components.

2. Brief Description of the Prior Art

It is known to fuse or merge video imagery from multiple sources such that the resultant image has improved information content relative to any one of the individual video images as shown in U.S. Pat. No. 5,140,416 of Richard D. Tinkler, the contents of which are incorporated herein by reference. The sensors generating the video imagery are typically responsive to different types of spectral content in the scene being scanned, such as visible, infra-red, and the like. This permits real-time high pixel rate operation with hardware implementation of moderate cost and complexity. Image enhancement by frequency content specification is another advantage of the above prior art approach. The flexibility permits application to many different video formats and line rates. Though the above described system and method have operated well for their intended purpose, operation is presently economically available with data rates up to about 16 MHz. Information data rates which far exceed 16 MHz are contemplated, such as 60 MHZ and higher and data rates in the vicinity of at least 60 MHz must have the ability to be processed in the present. Such data rates cannot be handled by the prior art systems since the prior art systems contemplate a single data path which is incapable of proper operation at the newly required increased data rates. The only way to handle data along a single path with increasing data rates is to provide hardware capable of accommodating such increased data rates. Unfortunately, the contemplated increases in data rates far exceed the presently expected increase in data handling capability of the hardware. It follows that an alternate approach is required to handle the higher data rates now contemplated.

SUMMARY OF THE INVENTION

In accordance with the present invention, there is achieved maximum information extraction and presentation of second generation FLIR video having high data rates which exceed the capability of present day hardware along a single path. The imagery is much improved in enhancing fine detail and minimizing dominance of background. The system is capable of operation at data rates of about 64 MHz and probably higher.

In accordance with the present invention, the high data rate is broken up into multiple data paths which are processed in parallel with circuitry capable of handling the reduced data rates provided by breaking the data up into the multiple data paths while maintaining the spatial context of the data. The number of paths is determined by the data rate and the data rate capability of each path whereby the data rate in each path is reduced to the handling capability of the hardware in that path. In addition, the paths are not independent since the spatial relationship of the data at the input must be maintained even though successive portions of the data are located in different paths. For example, if the data path is capable of handling data at a 16 MHz rate while the incoming data is being transmitted at 64 MHz rate, then at least four paths would be required to handle the data. The individual similar circuit elements utilized are substantially the same as those of the same type set forth in U.S. Pat. No. 5,140,416.

Briefly, the processor receives raw data indicative of, for example, background data which is generally relatively low frequency and detailed data which is generally relatively high frequency. The raw data has high dynamic range data at its input, this data being fed to each of a single convolution operator having N outputs, N phase equalization circuits and one or more video sampler circuits. The phase equalization circuits delay the incoming data so that the incoming data processed by the convolution operator reaches a subtractor at the same time and phase as the same incoming raw data. The video sampler provides a histogram of samples of the information, such histograms being well known in the art and often being referred to as a probability distribution function. The number N is the number of data paths in the circuit and is at least the lowest integer greater than the data rate of the raw high frequency high dynamic range data at the input divided by the maximum data rate handling capacity of the circuitry. Each of the N outputs of the convolution operator, which provides essentially a low pass filtering operation, and each of the outputs of the N phase equalization circuits are uniquely coupled to one of N subtract circuits, the raw data passing through the phase equalization circuit being delayed an amount equal to the delay in the convolution operator so that the raw data and the corresponding low pass filtered data reach the subtract circuits at the same time. Each subtract circuit provides an output signal which is the difference between the raw data and the low pass filtered data which is the detailed or feature data. The low pass filtered data and the feature data are provided to one of the N real time local area statistics circuits which is software which provides additional information to the background and feature transfer functions based upon the data operated upon by the convolution operator which provided the essentially low pass filtering function on the raw data along which is the background data with one of the outputs from the subtractor which is the feature data. A video sampler, which provides the histogram of the data which is an indication of the distribution of the data, provides an output signal to software algorithm/$\mu$P which is software which determines how the histogram should be operated upon to determine what should be loaded in the background and feature transfer function to be discussed hereinbelow to optimize the distribution. Background transfer function circuits, of which there are N, each receive the data from one output of the convolution operator outputs, one of the real-time local area statistics circuits and the software to provide outputs to combine and enhance features circuit and essentially remaps the data according to a predetermined formulation. The incoming data is read and altered according to the predetermined formulation to provide an output or, in other words, the input is remapped to the desired output. The predetermined formulation can be obtained by providing input data of a known scene and then providing an altering function to force that data to provide to known scene at the output. That altering function is then used thereafter to alter all other incoming data. The background transfer function circuits create an output to the display having a known intensity distribution of the pixels, such as by means of a Rayleigh transform or the like so that the background is individually optimized to have the desired distribution and the features are individually optimized to have the desired distribution. A feature transfer function circuit, of which there are N which operate in the same manner as discussed above with regard to the background transfer function circuit, each receives data from one of the subtract circuits, software and one of the real-time local area statistics circuits to provide further outputs to the combine and enhance circuit. The combine and enhance circuit combines the data spatially to provide compressed video optimized for the display dynamic range. It can be seen that either the background information alone or the feature information alone or a combination of the two can now be displayed with adjustment being made to the intensity of either or both.

The convolution operator is a circuit which low pass filters the incoming full bandwidth raw video input data to provide a blurred image or the background data. This is accomplished by breaking up the incoming data into N ordered paths in order to have the capability of handling the high data rate in a data ordering function block. That is, assuming N data paths, data for pixels 1 to N are sent in order to one of data paths 1 to N with data for pixels N+1 to 2N being sent in order to data paths 1 to N, etc. whereby each path handles only 1/N of the data rate. The data in each path is then subjected to a two dimensional decimation (reduction in bandwidth) and prefilter which includes a one dimensional pre-filter via an FIR filter which allows the information to be filtered such that when a fraction of the data is taken, it contains all of the low passed information from all of the adjacent pixels and is essentially a filtering function of well known type. The one-dimensional prefilter is in series with a two dimensional pre-filter which is also a FIR filter but provides the filtering function on a two dimensional basis including prior and subsequent lines of pixels. The output of the one dimensional pre-filter is subjected to a two dimensional spectral shaping filter which is also a FIR filter and further reduces the data rate or the volume of information as well as shaping the signal.

It is now necessary to return to the initial data rate to be able to subtract from the raw data. To accomplish this, the output of the shaping filter is then sent to a standard two dimensional interpolation filtering operation which comprises a 2-D interpolation filter which partially interpolates the data to provide some of the missing data by a factor of about 2 in each of the x and y directions to regenerate the original low pass filtered information in the N paths which is in series with N 1-D phase shift filters. The 2-D interpolation filter interpolates and returns the signal to the N output paths in proper spatial sequence in standard manner, the proper spatial relation being provided by the N 1-D phase shift filters. The signals in each output path are subjected to the one dimensional phase shift filters, the outputs of these filters providing the background information. The components of the convolution operator and their functions are well known in the art and require no further amplification.

DESCRIPTION OF THE PREFERRED EMBODIMENT

Figure 1:
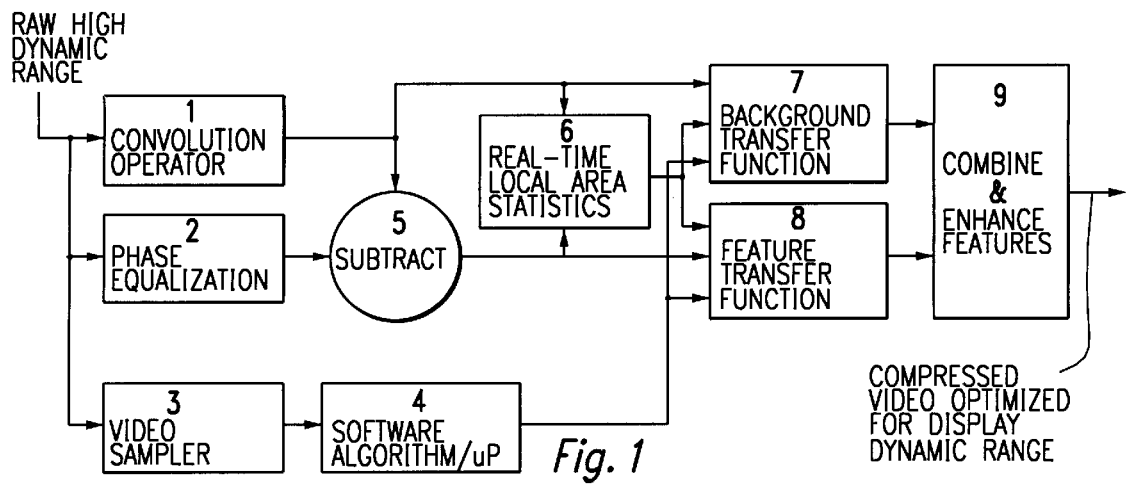
FIG. 1 is a block diagram of a local area image processor in accordance with the present invention.
Figure 1A:
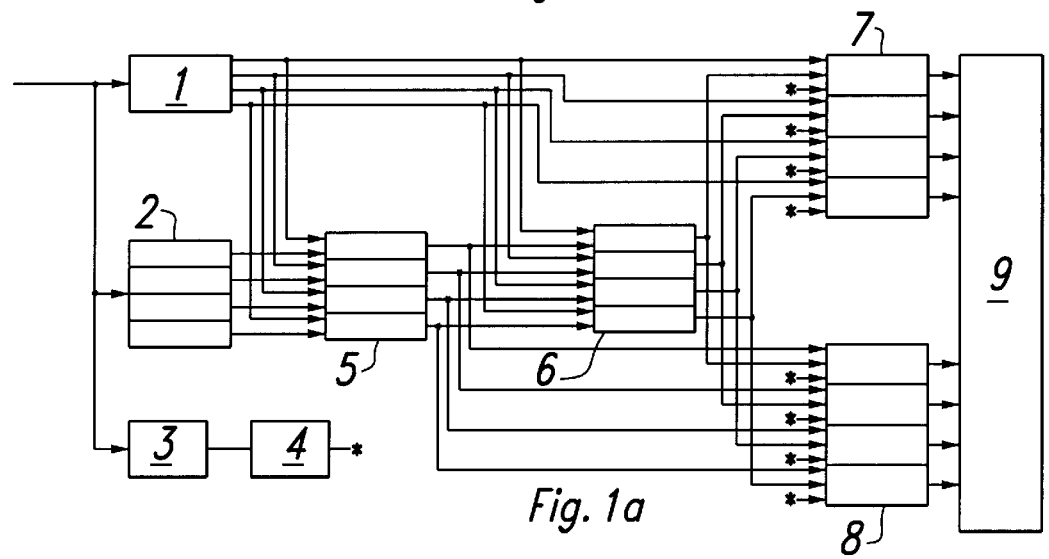
FIG. 1a is an expanded block diagram of the circuit of FIG. 1.

Referring to FIGS. 1 and 1a, there is shown a block diagram of a local area image processor in accordance with the present invention. The processor receives raw high dynamic range data at its input which is assumed, for the present example, to have a data rate of 64 MHz, this data being fed to each of a convolution operator 1 having N outputs, N=4 in the case of the preferred embodiment since the circuitry assumed and expected to be capable of operation up to 16 MHz (i.e., data applied to the convolution operator 1 at a 64 MHz rate is interlaced among the four outputs therefrom to provide four spatially related and differently phased outputs, each at a 16 MHz rate), a phase equalization circuit 2 which compensates for the delay incurred in the convolution operator 1, there being four such identical phase equalization circuits and at least one video sampler circuit 3. The phase equalization circuits 2 insure that the data arriving at the subtract circuits 5 from each of the convolution operator 1 and the initial input are co-temporal. Each output of the convolution operator 1 and each phase equalization circuit 2 is uniquely coupled to one of four subtract circuits 5 which subtracts the background information from the phase equalized raw data of the entire scene, each subtract circuit providing a signal to one of four real time local area statistics circuits 6 along with one of the outputs from the convolution operator 1. The real time local area statistics circuit 6 makes a statistical sampling of the scene and uses a small fraction of that information to provide a histogram of the scene and how the transfer functions are to be compressed in accordance with a software program. The video sampler 3 provides a statistical sampling of the scene or raw data as discussed above, one twelfth of the data in the preferred embodiment, and provides an output signal to software algorithm/$\mu$P 4. Software algorithm/$\mu$P 4 is a program which determines how the data is to be compressed. A background transfer circuit 7, there being four such circuits, each receive the data from the one output of the convolution operator 1, one of the real-time local area statistics circuits 6 and the software 4 to redistribute the gray levels and provide an output to combine and enhance features circuit 9. Feature transfer circuit 8, of which there are four, each receive data from one of the subtract circuits 5, software 4 and one of the real-time local area statistics circuits 6 to also redistribute the gray levels and provide an output to combine and enhance circuit 9. The combine and enhance circuit 9 combines the data spatially to provide compressed video optimized for the display dynamic range.

Figure 2:
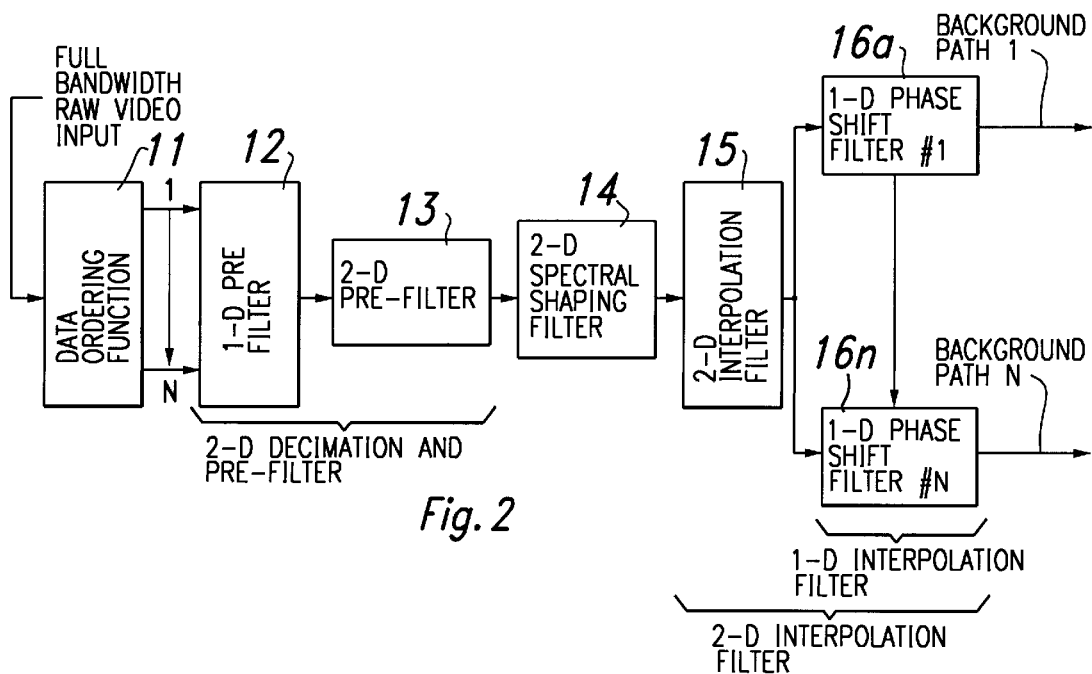
FIG. 2 is a block diagram of the convolution operator of FIG. 1.

Referring to the convolution operator 1 as shown in FIG. 2, this circuit low pass filters the incoming data to provide a blurred image or background data. This is accomplished by breaking up the incoming data into a number of ordered paths (shown as 1 . . . N) in order to be able to handle the high data rate in data ordering function block 11. It will be assumed for the preferred embodiment that the number of such data paths or N is equal to four. The number of paths is determined by the data rate and the data rate capability of each path whereby the data rate in each path is reduced to the capability of that path. In addition, the paths are not independent since the spatial relationship of the data at the input must be maintained even though successive portions of data are located in different paths. The data in each path is then subjected to a two dimensional decimation and prefilter which includes a one dimensional prefilter 12 in series with a two dimensional prefilter 13. The multiple inputs to filter 12 are essentially multiplexed to arrive at filter 13 along a single path, but at a higher data rate than the input to filter 12. The output of filter 12 is subjected to a two dimensional spectral shaping in filter 14 and is then sent to a two dimensional interpolation filter which comprises 2-D interpolation filter 15 and 1-D phase shift filters 16a to 16n. The 2-D interpolation filter 15 interpolates and returns the signal to the N output paths (four in this case). The signals in each output path are subjected to a one dimensional phase shift filter 16a to 16n. The outputs of the filters 16a to 16n provide the background information. The N background paths from the phase shift filters 16a to 16n are each connected to one of the subtract circuits 5 of FIGS. 1 and 1a.

The result is that the data is provided on a pixel by pixel basis with the data interlaced such that each 16 MHz information group is provided in order with the order repeated.

Though the invention has been described with reference to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. An image processing system which comprises:
   (a) a convolution operator having an input for receiving raw imaging data corresponding to a single source at a data rate N and having a plurality of output paths M, said convolution operator providing on each of said M output paths respective derived data derived from said imaging data, said convolution operator providing a time delay T to said imaging data between said input and said output paths and applying said derived data on a time delayed basis to said output paths in phased relation to the time of application of the corresponding imaging data to said convolution operator, said convolution operator providing a low pass filtering operation while deriving said derived data to provide background information therein;
   (b) a phase equalization circuit having an input for receiving said raw imaging data at said data rate N and having M output paths, each said output path of said phase equalization circuit corresponding to a respective said output path of said convolution operator, to provide a time delay to said raw imaging data at each said output path of said phase equalization circuit equal to said time delay T at said output paths of said convolution operator;
   (c) M subtractors each coupled to a respective said output path from said convolution operator and a respective said output path from said phase equalization circuit to subtract said background information received from said convolution operator from said raw imaging data received from said phase equalization circuit to provide feature information; and
   (d) means responsive to said background information from said convolution operator and said feature information from said subtractors to provide a combination of said background information and said feature information.

2. The system of claim 1 wherein said means responsive to said background information and said feature information includes M background transfer circuits, each said background transfer circuit receiving the data from a different one of said output paths of said convolution operator to redistribute the gray levels for providing said combination of said background information and said feature information.

3. The system of claim 2 wherein said means responsive to said background information and said feature information includes M feature transfer circuits, each said feature transfer circuit receiving the data from an output of a different one of said M subtractors to redistribute the gray levels for providing said combination of said background information and said feature information.

4. The system of claim 3 wherein said convolution operator includes means for applying said raw imaging data to M paths in interlaced relation.

5. The system of claim 4 wherein said convolution operator includes means for providing one of a one or two dimensional decimation to said data and means for providing a two dimensional interpolation of the decimated data.

6. The system of claim 1 wherein said means responsive to said background information and said feature information includes M feature transfer circuits, each said feature transfer circuit receiving the data from an output of a different one of said M subtractors to redistribute the gray levels for providing said combination of said background information and said feature information.

7. The system of claim 1 wherein said convolution operator includes means for applying said raw imaging data to M paths in interlaced relation.

8. The system of claim 7 wherein said convolution operator includes means for providing one of a one or two dimensional decimation to said data and means for providing a two dimensional interpolation of the decimated data.

9. A method of image processing which comprises the steps of:
   (a) providing a convolution operator having an input for receiving raw imaging data corresponding to a single source at a data rate N and having a plurality of output paths M, said convolution operator providing on each of said M output paths respective derived data derived from said imaging data, and causing said convolution operator to provide a time delay T to said imaging data between said input and said output paths and applying said derived data on a time delayed basis to said output paths in phased relation to the time of application of the corresponding imaging data to said convolution operator, said convolution operator providing a low pass filtering operation while deriving said derived data to provide background information therein;
   (b) providing a phase equalization circuit having an input for receiving said raw imaging data at said data rate N and having M output paths, each said output path of said phase equalization circuit corresponding to a respective said output path of said convolution operator, said phase equalization circuit providing a time delay to said raw imaging data at each said output path of said phase equalization circuit equal to said time delay T at said output paths of said convolution operator;
   (c) subtracting said background information received from said convolution operator from said raw image data received from said phase equalization circuit to provide feature information; and
   (d) combining said background information and said feature information.

10. The method of claim 9 wherein said step of combining said background information and said feature information comprises the step of redistributing the gray levels of said background information for providing said combination of said background information and said feature information.

11. The method of claim 10 wherein said step of combining said background information and said feature information comprises the step of redistributing the gray levels of said feature information for providing said combination of said background information and said feature information.

12. The method of claim 11 wherein said raw imaging data is applied to said M output paths in interlaced relation.

13. The method of claim 12 further including the steps of causing said convolution operator to effect one of a one or two dimensional decimation to said raw imaging data and a two dimensional interpolation of the decimated data.

14. The method of claim 10 wherein said raw imaging data is applied to said M output paths in interlaced relation.

15. The method of claim 14 further including the steps of causing said convolution operator to effect one of a one or two dimensional decimation to said raw imaging data and a two dimensional interpolation of the decimated data.

16. The method of claim 9 wherein said step of combining said background information and said feature information comprises the step of redistributing the gray levels of said feature information for providing said combination of said background information and said feature information.

17. The method of claim 16 wherein said raw imaging data is applied to said M output paths in interlaced relation.

18. The method of claim 17 further including the steps of causing said convolution operator to effect one of a one or two dimensional decimation to said raw imaging data and a two dimensional interpolation of the decimated data.

19. The method of claim 9 wherein said raw imaging data is applied to said M output paths in interlaced relation.

20. The method of claim 19 further including the steps of causing said convolution operator to effect one of a one or two dimensional decimation to said raw imaging data and a two dimensional interpolation of the decimated data.

21. An image processing apparatus which comprises:
a convolution operator responsive to raw imaging data, said convolution operator producing background data which is a function of said raw imaging data;
a supplemental section responsive to said raw imaging data and said background data for outputting further data which includes feature data and other data;
a statistics section responsive to said feature data and said background data, said statistics section producing statistics data which is a function of said feature data and said background data;
a background transfer function section responsive to said background data, said statistics output and said other data, said background transfer function section outputting remapped background data which includes remapping of said background data according to a background transfer function;
a feature transfer function section responsive to said statistics data, said other data, and said feature data, said feature transfer function section outputting remapped feature data which includes remapping of said feature data according to a feature transfer function; and
a combining section which combines said remapped background data and said remapped feature data.

22. An image processing apparatus according to claim 21, wherein said background data is produced by said convolution operator at a time delay T following application to said convolution operator of the corresponding raw imaging data; and wherein said supplemental section includes:
a phase equalization section responsive to said raw imaging data for producing phase equalized data which is said raw imaging data delayed by a time delay T; and
a subtractor section which generates said feature data by subtracting said background data from said phase equalized data.

23. An image processing apparatus according to claim 22, wherein said supplemental section includes:
a sampler section responsive to said raw imaging data for producing sampled data; and
a compression section responsive to said sampled data for generating said other data, said other data including compression control information.

24. An image processing apparatus according to claim 21, wherein said combining section combines said remapped background data and said remapped feature information so that the resulting combined data is image information optimized for a display dynamic range.

25. An image processing apparatus according to claim 24, wherein said combined data is in a compressed form.

26. An image processing apparatus according to claim 21, wherein said remapping effected by said background transfer function section and said feature transfer function section includes redistribution of gray levels as a function of said statistics data.

* * * * *